(12) United States Patent
Palazzo

(10) Patent No.: US 8,031,843 B2
(45) Date of Patent: Oct. 4, 2011

(54) VOICE MESSAGE RECALL

(75) Inventor: Richard Palazzo, Phillipsburg, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1423 days.

(21) Appl. No.: 11/396,188

(22) Filed: Mar. 31, 2006

(65) Prior Publication Data

US 2007/0263789 A1 Nov. 15, 2007

(51) Int. Cl.
*H04M 1/64* (2006.01)

(52) U.S. Cl. .......... 379/88.25; 340/7.52; 340/7.57; 369/29.01; 370/352; 379/88.18; 379/88.21; 379/88.23; 379/93.18; 379/142.06; 455/412.2

(58) Field of Classification Search .......... 379/67.1, 379/68–77, 84–85, 88.01–88.04, 88.16–88.18, 379/88.22–88.28, 88.21, 88.23, 88.25, 93.18, 379/142.06; 340/7.52, 7.57; 369/29.01; 370/352; 455/412.2

See application file for complete search history.

(56) References Cited

U.S. PATENT DOCUMENTS

| 4,949,085 | A | * | 8/1990 | Fisch et al. | 340/7.52 |
| 4,965,569 | A | * | 10/1990 | Bennett et al. | 340/7.57 |
| 5,153,579 | A | * | 10/1992 | Fisch et al. | 340/7.52 |
| 5,481,597 | A | | 1/1996 | Given | |
| 5,590,178 | A | * | 12/1996 | Murakami et al. | 379/93.18 |
| 5,966,351 | A | * | 10/1999 | Carleton et al. | 369/29.01 |
| 6,542,584 | B1 | * | 4/2003 | Sherwood et al. | 379/88.18 |
| 6,625,260 | B1 | * | 9/2003 | Brockman et al. | 379/88.21 |
| 7,221,743 | B2 | * | 5/2007 | Trinkel | 379/88.23 |
| 7,697,667 | B1 | * | 4/2010 | Wageman et al. | 379/88.25 |
| 7,783,283 | B2 | * | 8/2010 | Kuusinen et al. | 455/412.2 |
| 2005/0083906 | A1 | * | 4/2005 | Speicher | 370/352 |
| 2007/0263789 | A1 | * | 11/2007 | Palazzo | 379/67.1 |

* cited by examiner

*Primary Examiner* — Gerald Gauthier

(74) *Attorney, Agent, or Firm* — Cantor Colburn LLP

(57) ABSTRACT

A system and method for canceling a message sent to a recipient prior to retrieval by the recipient. A telephone call is received by a network from a calling party who desires to cancel a message left for a recipient through an earlier call from the calling party to the recipient after termination of the earlier call. By mapping the calling party's automatic number identifier (ANI) with at least one call record, a voice mailbox of the recipient may be accessed to determine whether the message has been retrieved by the recipient. If the message is still pending, the calling party is provided with the option to cancel the message. Alternatively, the calling party provides the telephone number from where the earlier call originated to a network server, which looks up the ANI of the originating number and then maps the ANI of that number with the at least one call record to enable the cancellation procedure.

10 Claims, 5 Drawing Sheets

VOICE MESSAGE RECALL

BACKGROUND OF THE INVENTION

The present invention relates generally to voice messaging, and more particularly, to a system and methodology that enables a caller to retract a voice message from a called party's voice mailbox prior to retrieval by the called party.

Voice messaging systems for sending and receiving messages between users that are subscribers of the system are well known in the art. A "subscriber" is a person that has actively subscribed to the voice messaging system by creating either (1) a voice mailbox and/or (2) a billing relationship with the provider where the Subscriber agrees to pay money, either directly or indirectly through the purchase of other services, for use of the voice messaging system.

A voice mailbox is a storage area within the voice messaging system that is addressable by a number. The number selected to address the voice mailbox may be any number, such a number coinciding with the subscriber's telephone number. The voice mailboxes of typical prior art voice messaging systems require that the subscriber both (1) periodically call into the system to determine if there are any messages in the mailbox, and (2) call into the system to listen to messages. Most people, however, already have separate voicemail systems or answering machines that answer the telephone and record messages from live callers. As such, these prior art voice messaging systems create yet another mailbox that both senders and/or receivers must check in addition to their existing answering machine or separate voicemail system.

Examples of a subscriber billing relationship include, but are not limited to, a monthly subscription fee, the purchase of related or unrelated services such as local telephone calling or long distance calling, or the outright purchase of a voice messaging system (hardware or software) through either an installment sale or single payment. It is through these and other types of billing relationships, or by creating a mailbox as described above, that people actively subscribe to become subscribers to prior art messaging systems.

After actively subscribing to the voice messaging service and/or creating a separate mailbox, a subscriber can send and receive messages with other subscribers by calling into the system, logging into the particular mailbox and then creating and sending messages to mailboxes of other subscribers within the same voice messaging system.

In an exemplary application, a subscriber who has previously subscribed to the voice messaging service, places a telephone call into the voice messaging system. The subscriber then signs into his or her voice mailbox, records a message for an intended recipient, and enters a telephone number of the intended recipient. The voice messaging service then determines whether the recipient is a subscriber to the voice messaging service. If the recipient is a subscriber, then the voice messaging system deposits the voice message in the recipient's voice mailbox. The recipient can then access the voice message by calling into the voice messaging system in a conventional manner. If the recipient is not a subscriber, the voice messaging service may call the recipient and simply play the recorded message.

There are often times when a message is left for a recipient and it is subsequently determined that the message was either sent in error or that the sender decides that the message should not have been sent. A sender might leave a message in the heat of the moment, and then regret having done so with the desire to retract the message. Accordingly, it would be advantageous to provide a system and methodology whereby a sender can retract a message left for a recipient.

An example of a prior art system that enables an originator to retract a message prior to delivery is the AT&T Audix® Voice Messaging System. In this expedient, the sender's message is created in the sender's own mailbox prior to delivery, which enables the message to be cancelled prior to delivery.

U.S. Pat. No. 5,481,597, which is assigned to the same assignee as the present invention, enables a user to cancel a sent message that has already been delivered to a recipient's mailbox prior to retrieval by the recipient. In the disclosed system, the message originator tags the message with a numeric code that functions as a message identifier. The originator of the message can access the recipient's mailbox by supplying the message originator tag, and then exercise control over the disposition of the message. One disadvantage of this system is that a message recipient must enable the message retrieval feature.

It would be desirable to provide a system and methodology whereby a calling party can cancel a sent message prior to retrieval by the message recipient without the need to specifically tag or modify the original message, and without the need for the recipient to enable a feature to permit callers to retrieve their messages. In addition, it would further be desirable to enable a calling party to cancel such a message after the calling party has terminated the original call that left the message.

SUMMARY OF INVENTION

A system and method are provided for enabling a calling party to cancel a message sent to a recipient prior to retrieval by the recipient. A telephone call is received by a network from the calling party who desires to cancel a message left for the recipient through an earlier call from the calling party to the recipient after termination of the earlier call. By mapping the calling party's automatic number identifier (ANI) with at least one call record, a voice mailbox of the recipient may be accessed to determine whether the message has been retrieved by the recipient. If the message is still pending, the calling party is provided with the option to cancel the message. In an alternative embodiment, the calling party can access a network server from a network access device and manually input the telephone number from where the call originated. The ANI of that telephone number is then mapped with the at least one call record to enable access to the voice mailbox of the recipient.

In accordance with one aspect of the invention, a method is provided for canceling a message sent to a recipient prior to retrieval by the recipient, comprising the steps of: receiving a telephone call from a calling party, the telephone call signaling a network with the calling party's desire to cancel a message left for at least one recipient through at least one earlier call from the calling party to the at least one recipient after termination of the at least one earlier call; mapping the calling party's automatic number identifier (ANI) with at least one call record; accessing a voice mailbox of at the least one recipient and determining whether the at least one message has been retrieved by the at least one recipient; and if the at least one message has not been received, providing the calling party with the option to cancel the at least one message.

In accordance with another aspect of the invention, a method is provided for canceling a message sent from a calling party to a recipient through a telephone call, prior to retrieval by the recipient and after termination of the call, comprising the steps of: receiving a telephone number from which the calling party originated an earlier call that has been terminated; mapping the calling party's automatic number ANI with at least one call record; accessing a voice mailbox of the recipient and determining whether the message has been retrieved by the recipient; and if the message has not been received, providing the calling party with the option to cancel the message.

In accordance with another aspect of the invention, a system is provided for enabling a calling party to cancel a message sent to a recipient prior to retrieval by the recipient, the system comprising a server including a processor and memory containing machine readable instructions which, when executed by the processor, enable the server to: receive a telephone call from a calling party, the telephone call signaling the server with the calling party's desire to cancel a message left for a recipient through an earlier call from the calling party to the recipient after termination of the earlier call; access a voice mailbox of the recipient and determine whether the message has been retrieved by the recipient; and if the message has not been received, provide the calling party with the option to cancel the message. In a modification of this embodiment, the server is adapted to receive a telephone number from a calling party through a network access device, and thereafter access at least one call record corresponding to the ANI of the telephone number provided through the network access device to effectuate cancellation of any messages using the foregoing procedures.

These and other advantages of the invention will be apparent to those of ordinary skill in the art by reference to the following detailed description and the accompanying drawings.

DETAILED DESCRIPTION OF THE PREFERRED EMBODIMENTS

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

It should be noted that the invention is not limited to any particular software language described or implied in the figures. One of ordinary skill in the art will understand that a variety of alternative software languages may be used for implementation of the invention. It will also be understood that some components and items are illustrated and described as if they were hardware elements, as is common practice within the art. However, one of ordinary skill in the art, and based on a reading of the detailed description, would understand that in at least one embodiment, components in the method and system may be implemented in software or hardware.

Figure 1:
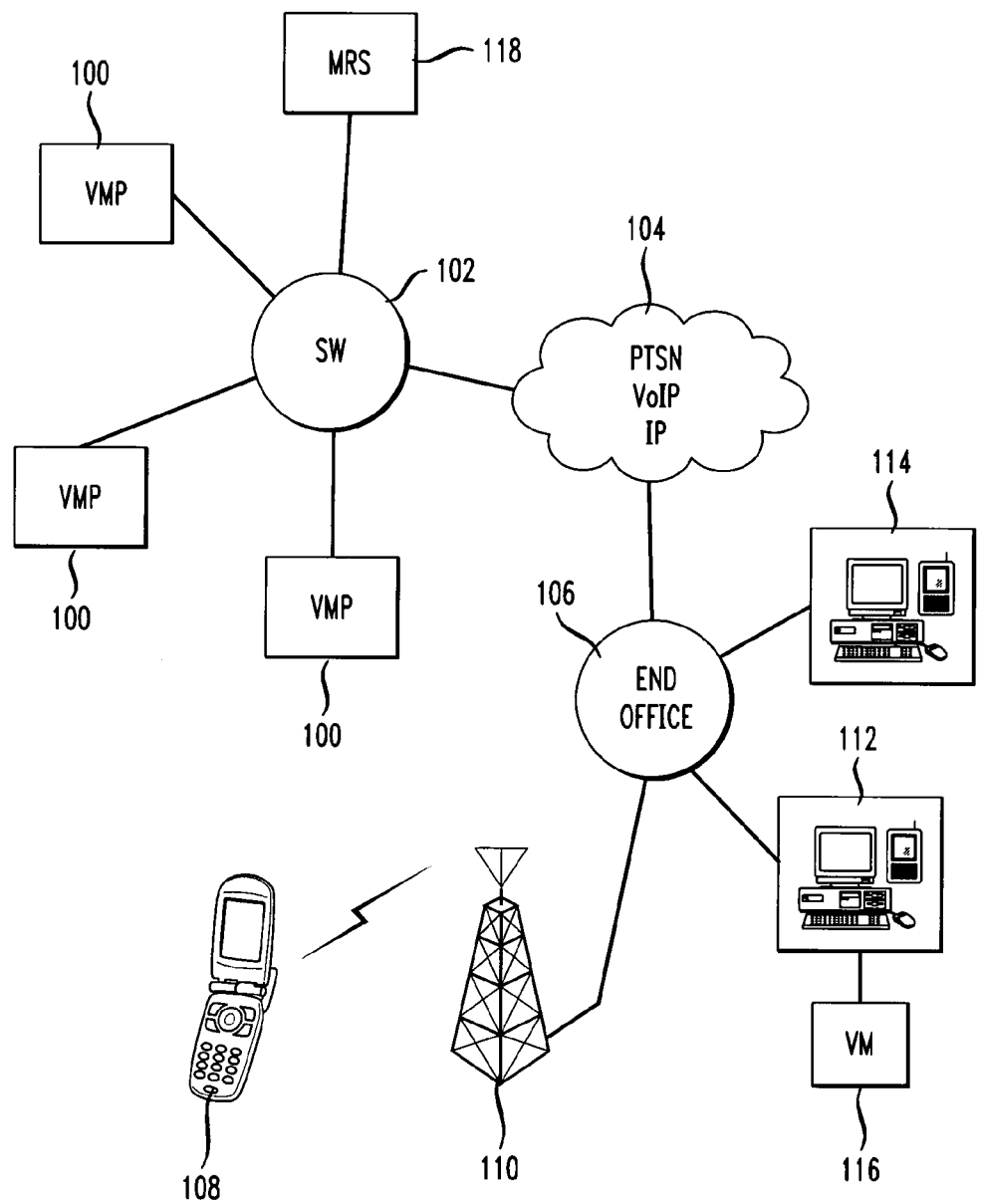
FIG. 1 is a schematic diagram of an exemplary system architecture in accordance with an aspect of the present invention.

FIG. 1 is a schematic depicting one or more exemplary voice messaging platforms (VMPs) 100 that communicate through a switching system 102 with a telecommunications network 104 (PTSN, VoIP, IP). The VMPs 100 and switching system 102 may be part of the telecommunications network 104 or separate components as is known in the art. A central office (CO) 106 couples a plurality of access devices, such as a mobile station 108 via a mobile switching center (MSC) 110, a wireline access device 112 and personal computer, VoIP phone or other web appliance 114 to the telecommunications network 104. A calling terminal such as access device 112 may have an integral or separate voicemail system 116 that is not part of the network. This is referred to below as a "stand-alone machine." In accordance with an aspect of the invention, a message retrieval server (MRS) 118 is coupled to telecommunications network 104 and each VMP 100 through switching system 102. The VMRS 118 is operable to enable a sender to retrieve a sent message prior to retrieval as will be described in more detail below.

Figure 2:
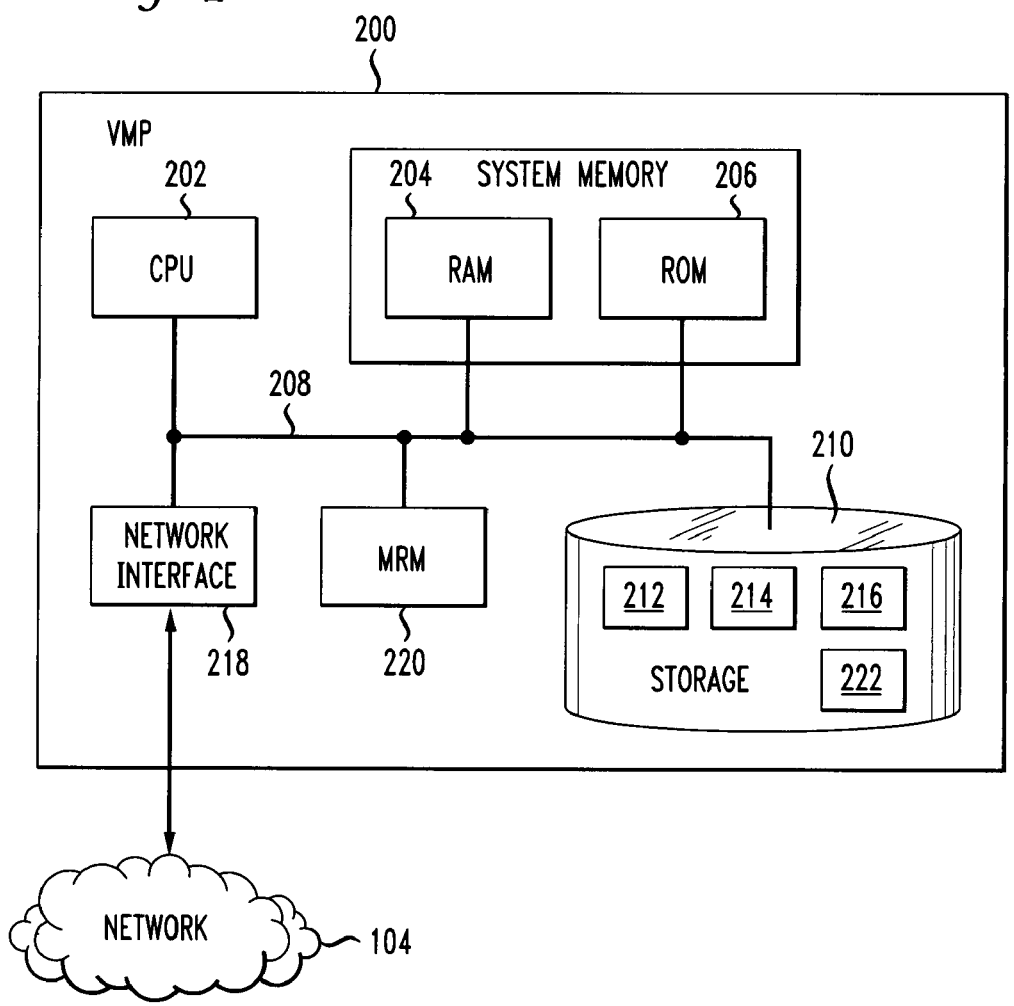
FIG. 2. is a schematic of an exemplary voice messaging platform.

FIG. 2 is a schematic of an illustrative VMP 200, each of which is a server computer connected to the network 104 depicted in FIG. 1. The VMP 200 includes a central processing unit (CPU) 202 coupled to system memory including random access memory (RAM) 204 and read-only memory (ROM) 206 via a system bus 208. The VMP 200 further includes mass storage 210 for storing an operating system 212 and application programs 214 for implementing the functionality of the VMP 200, as well as mailboxes 216 for subscribers. The application programs 214 enable subscribers to record and receive messages in a conventional manner. The processor 202 is coupled to a network interface 218 that enables the VMP 200 to communicate with the communications network depicted in FIG. 1. A basic input/output system (BIOS) comprising routines to enable the transfer of information between elements of the VMP 200 is stored in ROM 206. The mass storage 210 is connected to CPU 202 via a controller (not shown) coupled to bus 208 as is known in the art. The mass storage 210 and associated computer-readable media provide non-volatile storage for the VMP 200. The computer readable media may include volatile and non-volatile media implemented in any known technology for storing computer readable information as is well known. In accordance with an aspect of the invention, the VMP 200 includes a message recall module (MRM) 220 for enabling a sender of a message to retract the same prior to retrieval by the message recipient. The MRM 220 is responsive to commands from the MRS 118 through a signaling protocol.

The VMP 200 maintains a customer profile database 222 in mass storage 210 that includes various fields associated with each subscriber to the voicemail services that reside on the VMP 200. The fields define a customer profile and may include, as is well known, a subscriber's login identity, password, and information relating to various devices that the subscriber may use to access messages. A subscriber may be notified of voicemail on a plurality of devices such as wireless application protocol devices including wireless phones, personal assistants, laptops and the like, as well as through landline telephones. For example, a subscriber may be notified by e-mail of pending e-mail messages or by a short messaging system (SMS) using well-known protocols.

Figure 3:
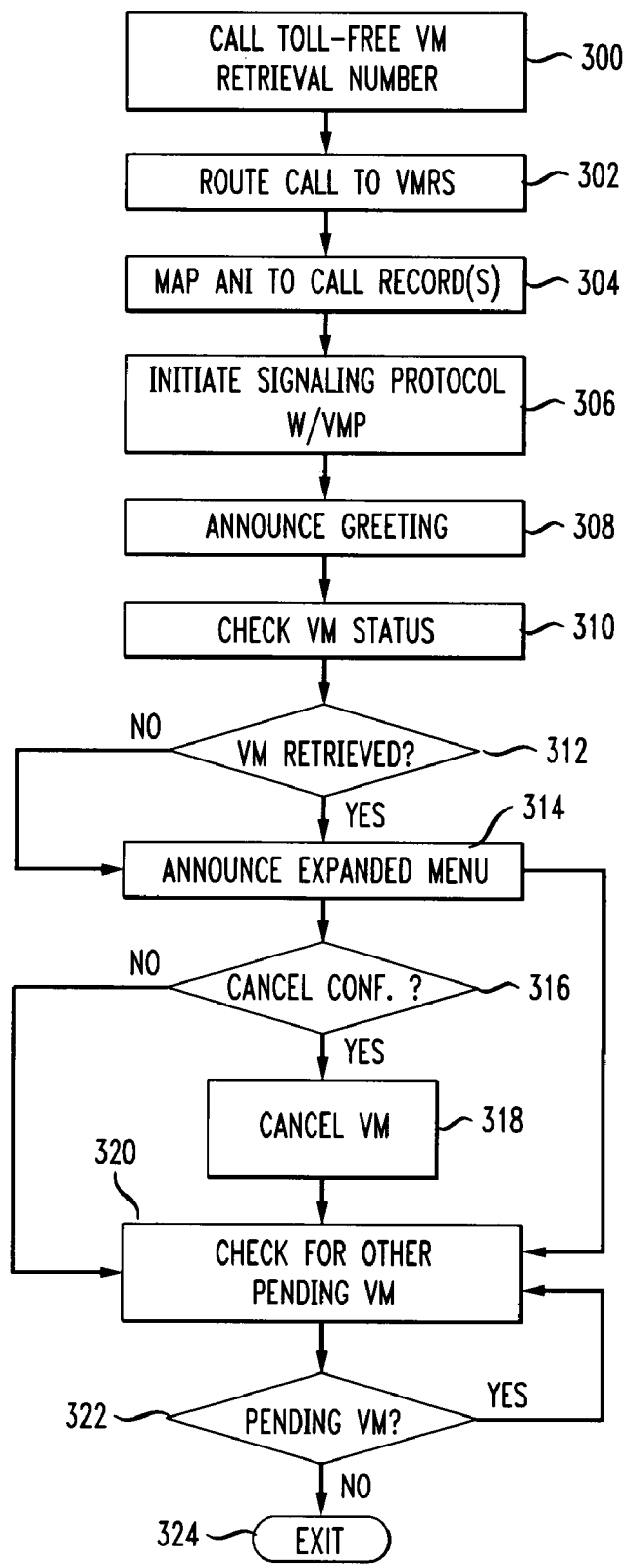
FIG. 3 is a flow-diagram of a method for carrying out an aspect of the present invention.

The NRM 220 in the VMP 200 and MRS 118 enable cancellation of sent messages under certain conditions. In accordance with an aspect of the invention, a caller can call a prescribed telephone number after a message has been deposited in a subscriber's mailbox to cancel the message prior to retrieval by the message recipient after the call has been terminated. In this connection, FIG. 3 is a flow diagram of an illustrative process for carrying out a method in accordance with an aspect of the present invention. In block 300, a caller who desires to retract a message makes a phone call to a toll-free voicemail cancellation number to initiate the cancellation procedure. The call is routed to the MRS 118 (FIG. 1) at block 302. At block 304, the MRS 118 processes the call and checks the automatic number identifier (ANI) of the call to the cancellation number made by the caller. In a modification of this embodiment, a caller can access the MRS 118 via a network access device generally characterized by the reference numeral 114 in FIG. 1. The MRS 118 can provide an interactive menu to enable the caller to manually input the telephone number from where the last call originated. This is particularly applicable to a VoIP service, which enables callers to manage their accounts over the Web as is well known in the art and therefore need not be described in detail here. In either expedient, the ANI is then mapped to the record of the caller's most recent call to the recipient. When the destination of the last call is determined by the network, the MRS 118 then initiates a signaling protocol with the VMP 200 at block 306. At block 308, the VMP announces a greeting to the caller regarding the identity of the subscriber whose mailbox has been reached. Note, the steps of announcing greetings to the caller may be centrally accomplished at the MRS 118 in lieu of the VMP 200, especially in situations where multiple VMPs 200 are accessed. At block 310, the VMP 200 checks the status of pending messages in the recipient's mailbox. If the last message (or messages) for the recipient from the caller has not been retrieved by the recipient at decision block 312, then the VMP 200 announces in an expanded menu the option to cancel the message at block 314. If the last message has already been retrieved by the recipient, then the VMP 200 announces that the option to cancel the message no longer exists. If the message can still be cancelled, then the caller is provided with the option to confirm cancellation at block 316, and the VMP 200 deletes the message associated with the calling party's ANI at block 318. If the caller decides not to cancel the message, control jumps to block 320 where the VMP 200 checks for any additional pending messages for the first message recipient or for messages associated with earlier call records (could be multiple recipients) that are mapped to the calling party's ANI. If there are any pending messages at block 322 that are determined to have not yet been retrieved, then the process loops back to block 314. If not, then the VMP 200 terminates the process at block 324. It will be appreciated that the process of determining whether there are additional messages to be deleted can include searching for other prior calls that are mapped to the ANI based on the calling records. A series of prompts can be provided to enable the caller to delete any such messages in the same manner described above. Furthermore, such messages may reside in different VMPs 200. In this case, the MRS 118 determines which particular VMP 200 to signal based on the calling records.

Figure 4:
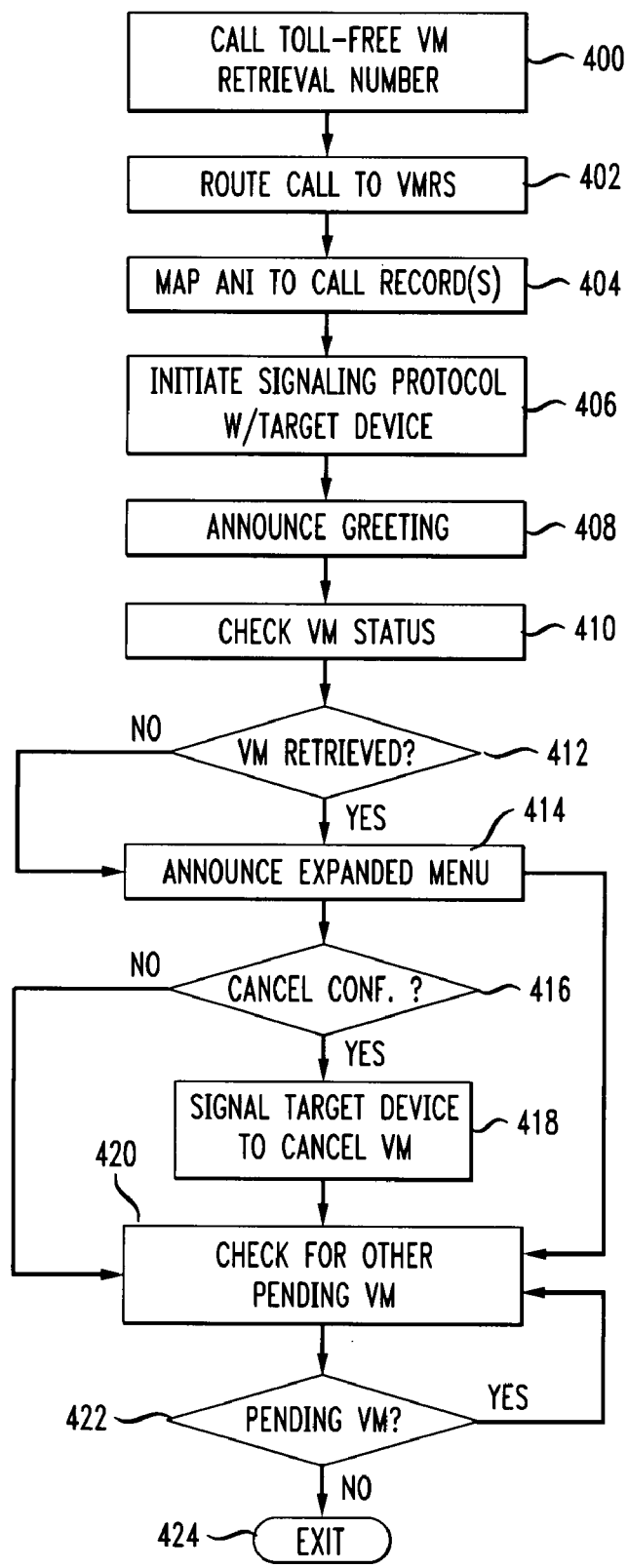
FIG. 4 is a flow-diagram of a method for carrying out another aspect of the present invention.

The operation of the system in accordance with the present invention can also be applied to stand-alone voicemail machines (not on a service provider's network). In such an embodiment, the MRS 118 communicates with a target stand-alone machine (e.g., 116 in FIG. 1) via a signaling protocol and deletes any pending message for the recipient using the same principles. The methodology for implementing this feature is similar to that described above and illustrated in FIG. 3. In this expedient, the stand-alone machine would be programmed to allow receipt of external signals only for the purpose of deleting pending messages that had not been retrieved. FIG. 4 is a flow diagram of a method for carrying out this aspect of the invention. In block 400, a caller who desires to retract a message makes a phone call to a toll-free voicemail cancellation number to initiate the cancellation procedure. The call is routed to the MRS 118 (FIG. 1) at block 402. At block 404, the MRS 118 processes the call and checks the automatic number identifier (ANI) of the last call made by the caller. When the destination of the last call is determined by the network, the MRS 118 then initiates a signaling protocol with the stand-alone machine 116 at block 406. At block 408, the MRS 118 announces a greeting to the caller regarding the identity of the message recipient based on a caller ID associated with the recipient's telephone number. At block 410, the MRS 118 checks the status of pending messages in the stand-alone machine 116 using the signaling protocol. If the last message for the recipient from the caller has not been retrieved by the recipient at decision block 412, then the MRS 118 announces in an expanded menu the option for the sender to cancel the message at block 414. If the last message has already been retrieved by the recipient, then the MRS 118 announces that the option to cancel the message no longer exists. If the message can still be cancelled, then the caller is provided with the option to confirm cancellation at block 416, and the MRS 118 signals the stand-alone machine 116 to delete the message associated with the calling party's ANI at block 418. If the caller decides not to cancel the message, control jumps to block 420 where the MRS 118 checks for any additional pending messages, again utilizing the signaling protocol with the stand-alone machine 116. If there are any pending messages in the stand-alone machine 116 at block 422, then the process loops back to block 414. If not, then the MRS 118 disconnects from stand-alone machine 116 and terminates the process at block 324.

Figure 5:
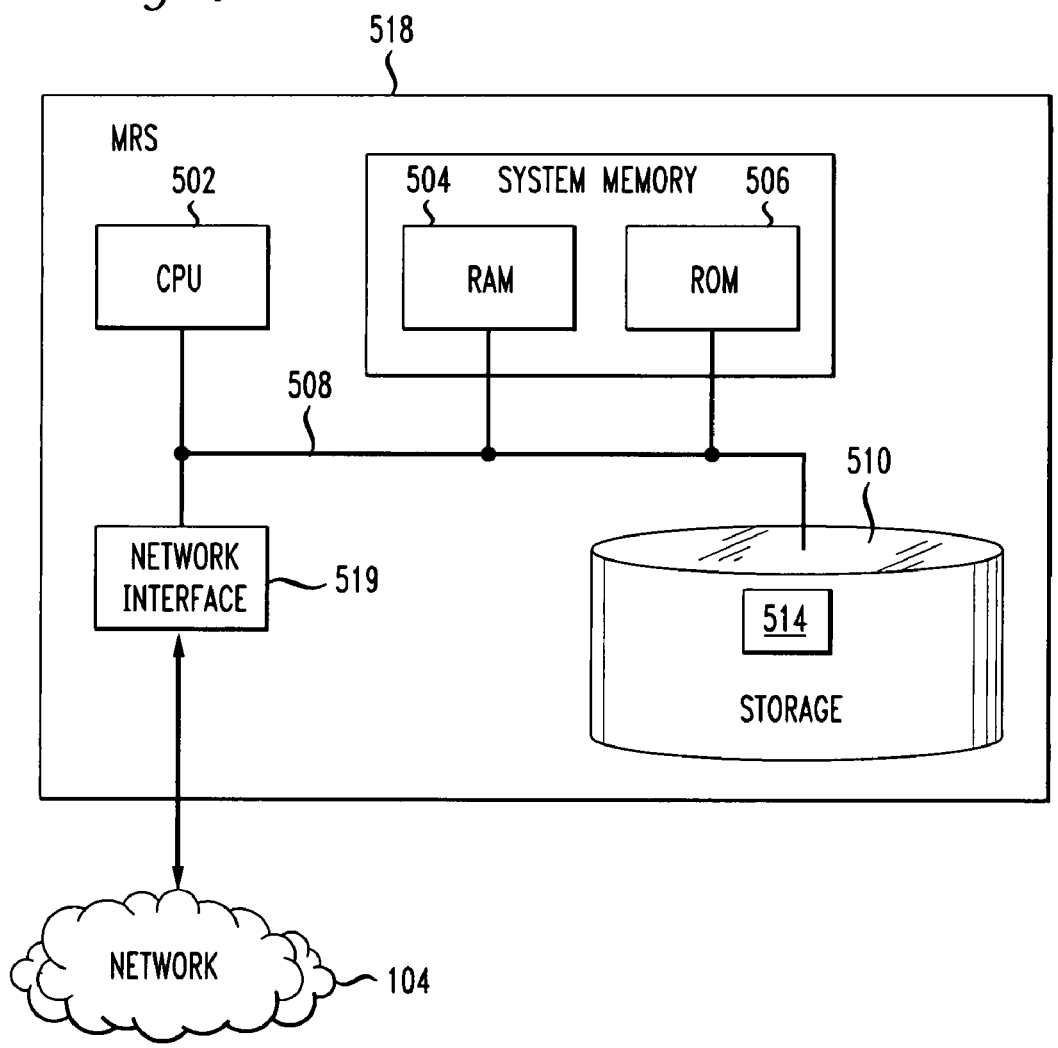
FIG. 5 is a schematic of an exemplary message retrieval server in accordance with an aspect of the present invention.

FIG. 5 is a schematic of a MRS 518 (corresponding to 118 depicted in FIG. 1). The MRS 518 is a server computer connected to the network 104 depicted in FIG. 1. The MRS 518 includes a CPU 502 coupled to system memory including random access memory RAM 504 and read-only memory ROM 506 via a system bus 508. The MRS 518 further includes mass storage 510 for storing an operating system 512 and application programs 514 for implementing the functionality of the MRS 518. The application programs 514 enable the MRS 518 to look up a calling party's last called number based on the ANI, and to initiate a signaling protocol with the VMP 200 (FIG. 2) or stand-alone machine 116 described above to cancel unopened messages. The processor 502 is coupled to a network interface 519 that enables the MRS 518 to communicate with the communications network depicted in FIG. 1. A basic input/output system (BIOS) comprising routines to enable the transfer of information between elements of the MRS 518 is stored in ROM 506. The mass storage 510 is connected to CPU 202 via a controller (not shown) coupled to bus 508 as is known in the art. The mass storage 510 and associated computer-readable media provide non-volatile storage for the MRS 518. The computer readable media may include volatile and non-volatile media implemented in any known technology for storing computer readable information as is well known. The depicted structure of the MRS 518 is intended to be merely exemplary as one skilled in the art will appreciate that the various functions of the MRS may be implemented in a variety of forms of hardware and/or software.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations which, although not explicitly shown or described herein, embody the principles of the invention and are within their spirit and scope.

I claim:

1. A method for canceling a message sent to a recipient prior to retrieval by the recipient, comprising:
   receiving a telephone call from a calling party at a designated toll-free voicemail cancellation number, the telephone call signaling a network with the calling party's desire to cancel a message left for a recipient through an earlier call from the calling party to the recipient after termination of the earlier call;
   accessing a voice mailbox of the recipient and determining whether the message has been retrieved by the recipient; and
   if the message has not been received, providing the calling party with the option to cancel the message.

2. The method recited in claim 1, further comprising mapping the calling party's automatic number identifier (ANI) to the record of the earlier call to access the voice mailbox of the recipient.

3. The method recited in claim 2, further comprising locating an additional call record of an earlier call from the calling party and providing the calling party with the option to cancel an additional message associated with the additional call record.

4. The method recited in claim 3, wherein the ANI is mapped to a plurality of call records to provide the calling party with the option to cancel a plurality of messages prior to retrieval by at least one recipient.

5. The method recited in claim 1, further comprising initiating a signaling protocol with a stand-alone voice mailbox to enable the calling party to cancel a message left in the stand-alone voice mailbox prior to retrieval.

6. In a system for enabling a calling party to cancel a message sent to a recipient prior to retrieval by the recipient, a server including a processor and memory containing machine readable instructions which, when executed by the processor, enable the server to:
   receive a telephone call from a calling party at a designated toll-free voicemail cancellation number, the telephone call signaling the server with the calling party's desire to cancel a message left for a recipient through an earlier call from the calling party to the recipient after termination of the earlier call;
   access a voice mailbox of the recipient and determine whether the message has been retrieved by the recipient; and
   if the message has not been received, provide the calling party with the option to cancel the message.

7. The system recited in claim 6, wherein the server is adapted for mapping the calling party's automatic number identifier (ANI) to the record of the earlier call to access the voice mailbox of the recipient.

8. The system recited in claim 7, wherein the server is further adapted for locating an additional call record of an earlier call from the calling party and providing the calling party with the option to cancel an additional message associated with the additional call record.

9. The system recited in claim 8, wherein the server is further adapted for mapping the ANI to a plurality of call records to provide the calling party with the option to cancel a plurality of messages prior to retrieval by at least one recipient.

10. The system recited in claim 6, wherein the server is adapted to initiate a signaling protocol with a stand-alone voice mailbox to enable the calling party to cancel a message left in the stand-alone voice mailbox prior to retrieval.

* * * * *